(12) United States Patent
Takeda et al.

(10) Patent No.: US 12,528,075 B2
(45) Date of Patent: Jan. 20, 2026

(54) METHANE COMBUSTION CATALYST, METHOD FOR PRODUCING THE SAME AND METHOD FOR PURIFYING COMBUSTION EXHAUST GAS

(71) Applicant: TANAKA KIKINZOKU KOGYO K.K., Tokyo (JP)

(72) Inventors: Kazutaka Takeda, Tsukuba (JP); Syunsuke Kato, Tsukuba (JP); Shunji Kikuhara, Tsukuba (JP); Kanako Kurahashi, Tokyo (JP); Tatsushi Minami, Tokyo (JP); Masahiro Shiraki, Tokyo (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 518 days.

(21) Appl. No.: 17/923,205

(22) PCT Filed: May 6, 2021

(86) PCT No.: PCT/JP2021/017317
§ 371 (c)(1),
(2) Date: Nov. 3, 2022

(87) PCT Pub. No.: WO2021/230119
PCT Pub. Date: Nov. 18, 2021

(65) Prior Publication Data
US 2023/0173464 A1 Jun. 8, 2023

(30) Foreign Application Priority Data
May 15, 2020 (JP) .................................. 2020-086355

(51) Int. Cl.
*B01J 23/46* (2006.01)
*B01D 53/86* (2006.01)
(Continued)

(52) U.S. Cl.
CPC .......... *B01J 23/468* (2013.01); *B01D 53/865* (2013.01); *B01J 23/14* (2013.01); *B01J 23/42* (2013.01);
(Continued)

(58) Field of Classification Search
None
See application file for complete search history.

(56) References Cited

FOREIGN PATENT DOCUMENTS

| EP | 3 673 992 A1 | 7/2020 |
|---|---|---|
| JP | 2006-272079 A | 10/2006 |

(Continued)

OTHER PUBLICATIONS

WO 2019039513A1 machine translation (Year: 2019).*
(Continued)

*Primary Examiner* — Michael Forrest
*Assistant Examiner* — Nicole Lee Quist
(74) *Attorney, Agent, or Firm* — Foley & Lardner LLP

(57) ABSTRACT

The present invention relates to a methane combustion catalyst including platinum and iridium supported on a tin oxide carrier for combusting methane in a combustion exhaust gas containing sulfur oxide. In the methane combustion catalyst, a ratio $R_{TO}$ of platinum oxides to metal platinum is 8.00 or more, wherein the ratio $R_{TO}$ is based on existence percentages of the metal platinum (Pt) and the platinum oxides (PtO and $PtO_2$) obtained from a platinum 4f spectrum analyzed and measured by X-ray photoelectron spectroscopy (XPS) and calculated in accordance with the following expression. In the following expression, $R_{Pt}$ is an existence percentage of the metal platinum (Pt), $R_{Pto}$ is an existence percentage of PtO, and $R_{Pto2}$ is an existence percentage of $PtO_2$.

$$R_{TO}=(R_{PtO}+R_{PtO2})/R_{Pt} \qquad \text{[Expression 1]}$$

20 Claims, 2 Drawing Sheets

(51) Int. Cl.
    *B01J 23/14*     (2006.01)
    *B01J 23/42*     (2006.01)
    *B01J 35/34*     (2024.01)
    *B01J 35/56*     (2024.01)
    *B01J 37/02*     (2006.01)
    *B01J 37/08*     (2006.01)

(52) U.S. Cl.
    CPC ........... *B01J 37/0201* (2013.01); *B01J 37/08* (2013.01); *B01D 2257/7025* (2013.01); *B01D 2258/01* (2013.01); *B01J 35/34* (2024.01); *B01J 35/56* (2024.01); *B01J 2523/827* (2013.01); *B01J 2523/828* (2013.01)

(56) References Cited

FOREIGN PATENT DOCUMENTS

| | | | | |
|---|---|---|---|---|
| JP | 4283037 | B2 | 6/2009 | |
| JP | 4429950 | B2 | 3/2010 | |
| JP | 2013-215718 | A | 10/2013 | |
| WO | WO-2019039513 | A1 * | 2/2019 | ............. B01D 53/86 |

OTHER PUBLICATIONS

European Patent Office Extended European Search Report issued in corresponding European Patent Application No. 21803884.2, dated Sep. 27, 2023.

L. Zhao et al., "Pt—Ir—$SnO_2$/C Electrocatalysts for Ethanol Oxidation in Acidic Media," Chin. J. Catal., 2011, 32: 1856-1863.

Office Action issued in corresponding Chinese Patent Application No. 202180034029.X dated Dec. 28, 2023 (13 pages).

International Searching Authority, "International Search Report," issued in connection with International Patent Application No. PCT/JP2021/017317, dated Jun. 15, 2021.

International Searching Authority, "Written Opinion," issued in connection with International Patent Application No. PCT/JP2021/017317, dated Jun. 15, 2021.

Office Action issued in corresponding Chinese Patent Application No. 202180034029.X dated Jul. 12, 2024 (9 pages).

Office Action issued in corresponding Korean Patent Application No. 10-2022-7033342 dated Sep. 2, 2024 (19 pages).

* cited by examiner

METHANE COMBUSTION CATALYST, METHOD FOR PRODUCING THE SAME AND METHOD FOR PURIFYING COMBUSTION EXHAUST GAS

CROSS-REFERENCE TO RELATED APPLICATIONS

The present application claims priority under 37 U.S.C. § 371 to International Patent Application No. PCT/JP2021/017317, filed May 6, 2021, which claims priority to and the benefit of Japanese Patent Application No. 2020-086355, filed on May 15, 2020. The contents of these applications are hereby incorporated by reference in their entireties.

BACKGROUND OF THE INVENTION

Field of the Invention

The present invention relates to a catalyst for oxidatively removing methane from a combustion exhaust gas containing sulfur oxide. Specifically, it relates to a catalyst having catalyst poisoning with sulfur oxide suppressed, and capable of oxidizing methane with higher activity as compared with a conventional product. The present invention also relates to a purification method comprising oxidatively removing methane from a combustion exhaust gas with the catalyst.

Description of the Related Art

Exhaust gases generated from engines, boilers and the like using hydrocarbons, such as natural gas, city gas, light oil, and kerosene, as fuel contain not only nitrogen oxide (NOx), sulfur oxide ($SO_2$, SOx), carbon monoxide (CO), odorant/soot and dust, and the like but also unburnt hydrocarbons. All of these can be a cause of environmental pollution, and the exhaust gasses are then discharged after being treated with a filter or a purification catalyst. In particular, methane has been reported to cause the greenhouse effect 20 times or more as much as carbon dioxide, and hence is very highly necessary to be removed from the viewpoint of environmental protection.

As a purification catalyst for hydrocarbons, a noble metal catalyst containing a catalyst particle of a noble metal such as platinum supported on a carrier of alumina, zirconia or the like has been used for a long period of time. It is known, however, that such a noble metal catalyst is not very effective for oxidative removal of methane. In particular, when sulfur oxide is contained in an exhaust gas, there arises a problem that activity is conspicuously decreased by catalyst poisoning.

Under this background, as a catalyst for oxidatively removing methane from a combustion exhaust gas containing sulfur oxide, catalysts described in Patent Document 1 and Patent Document 2 are known. These catalysts contain a catalyst particle of platinum supported on a tin oxide (SnO2) carrier. In particular, in the catalyst of Patent Document 2, iridium is further supported to improve durability.

PRIOR ART DOCUMENT

Patent Document

Patent Document 1: Japanese Patent No. 4283037
Patent Document 2: Japanese Patent No. 4429950

SUMMARY OF THE INVENTION

Technical Problem

It is confirmed that the catalysts of Patent Documents 1 and 2 (hereinafter they may be referred to as the Pt/$SnO_2$ catalyst and the Pt—Ir/$SnO_2$ catalyst; respectively, both of which may be generically referred to as the Pt/$SnO_2$-based catalyst) definitely have an effect of oxidatively removing methane from a combustion exhaust gas containing sulfur oxide. In particular, when the sulfur oxide concentration in the exhaust gas is 1 ppm or more, the Pt/$SnO_2$-based catalyst has an interesting characteristic of presenting improved activity. The Pt/$SnO_2$-based catalyst is also a significant catalyst in that activity effective against methane is exhibited by supporting platinum, whose effectiveness has not been recognized, on a tin oxide carrier. In addition, it has been confirmed that the Pt—Ir/$SnO_2$ catalyst in which iridium is additionally supported on a Pt/$SnO_2$ catalyst has improved durability.

In the field of catalysts, however, those capable of exhibiting higher activity are always required. Also as for methane combustion catalysts, those exhibiting higher activity than conventional ones are similarly required. The present invention was devised under this background, and an object is to provide a methane combustion catalyst that is based on the Pt/$SnO_2$-based catalyst and has higher activity, and a method for producing the same.

Solution to Problem

Even if a conventional Pt/$SnO_2$-based catalyst needs sulfur oxide for methane combustion, this does not mean that sulfur oxide does not harmfully affect the catalytic activity. Activity mechanism for methane combustion activity of the Pt/$SnO_2$-based catalyst was examined to discuss a state of platinum used as a catalyst particle in particular. As a result, it was concluded that the Pt/$SnO_2$-based catalyst has activity for methane combustion only when platinum is in the form of oxides (PtO or $PtO_2$). The Pt/$SnO_2$-based catalyst is produced by burning with a platinum complex supported on a tin oxide carrier, which will be described in detail later. During this process, platinum is presumed to be in an oxidized state owing to oxidation effect caused by burning and interaction with the tin oxide carrier that is an oxide.

It was discussed, as a mechanism of catalyst poisoning of the Pt/$SnO_2$-based catalyst caused by sulfur oxide, that the sulfur oxide deforms the catalyst particle (platinum oxides). The present inventors thus presumed because the Pt/$SnO_2$-based catalyst does not show a general degradation tendency through adsorption of a poisoning substance. If sulfur oxide is a general poisoning substance to decrease the activity because the adsorption thereof inhibits adsorption between a combustion component (methane) and the catalyst particle, the activity stops decreasing when the adsorbed amount of the poisoning substance reaches equilibrium. According to test and examination performed by the present inventors, however, the Pt/$SnO_2$-based catalyst does not show such a tendency but the activity continuously decreases even when the adsorbed amount of sulfur oxide reaches equilibrium at an initial stage of the reaction. This reveals that the catalyst particle (platinum oxides) is deformed by sulfur oxide.

The present inventors have discussed a specific mechanism of the activity decrease of the Pt/$SnO_2$-based catalyst caused by sulfur oxide as follows. Sulfur oxide such as $SO_2$ reaching the vicinity of a catalyst particle (platinum oxides)

is easily oxidizable, and hence is oxidized to $SO_3$ or the like by depriving oxygen from the platinum oxides and desorb. The platinum particle that is deprived of oxygen and metalated sinters together with a platinum particle similarly metalated nearby to form a coarse platinum particle. The platinum particle thus metalated and coarsened is poor in methane combustion activity. In addition, the metalation of platinum oxides and the sintering of a platinum particle continue even after the adsorbed amount of sulfur oxide reaches equilibrium, and then the activity continuously decreases.

The present inventors discussed the activity mechanism and the mechanism of the activity decrease by sulfur oxide of the $Pt/SnO_2$-based catalyst, as described above. Based on this discussion, a cause of good durability of a $Pt-Ir/SnO_2$ catalyst obtained by additionally supporting iridium on a $Pt/SnO_2$ catalyst revealed in Patent Document 2 can be also explained. In the $Pt-Ir/SnO_2$ catalyst, iridium is present in the form of oxide ($IrO_2$) similarly to platinum, but it is presumed that iridium and iridium oxide minimally have an activation effect for methane combustion. It is, however, regarded that iridium oxide has a function to retain the oxidized state of platinum by supplying oxygen to platinum metalated by oxidation effect of sulfur oxide. In addition, iridium oxide is metalated by reduction caused through the oxygen supply to platinum, or reduction caused by sulfur oxide, but the reduced iridium can retain an oxidized iridium state by receiving oxygen supply from the tin oxide carrier. It is presumed owing to such effect of iridium oxide that the durability of the methane combustion catalyst is improved.

Based on this discussion, some guidelines can be derived for improving initial activity and ensuring durability of a $Pt/SnO_2$-based catalyst. In other words, for improving initial activity, it is necessary to increase the amount of platinum in the form of oxides working as an activity source. For ensuring durability, it is also necessary to additionally support iridium, and in order to make the effect of iridium effective, it is necessary to finely disperse platinum at the stage of production of the catalyst and to support iridium nearby. Under these guidelines, the present inventors made earnest studies on a method for producing a $Pt/SnO_2$-based catalyst and optimization of the constitution thereof. As a result, the present invention was accomplished as a $Pt/SnO_2$-based catalyst in which platinum in a properly oxidized state is dispersed.

The present invention that solves the above-described problem is drawn to a methane combustion catalyst including platinum and iridium supported on a tin oxide carrier, and for combusting methane in a combustion exhaust gas containing sulfur oxide, in which a ratio $R_{TO}$ of platinum oxides to metal platinum is 8.00 or more (and 16.00 or less), the ratio $R_{TO}$ being based on existence percentages of the metal platinum (Pt) and the platinum oxides (PtO and $PtO_2$) obtained from a platinum 4f spectrum of the methane combustion catalyst measured by X-ray photoelectron spectroscopy (XPS) and calculated in accordance with the following expression.

$$R_{TO}=(R_{PtO}+R_{PtO2})/R_{Pt} \quad \text{[Expression 1]}$$

wherein $R_{Pt}$ is an existence percentage of the metal platinum (Pt), $R_{Pto}$ is an existence percentage of PtO, and $R_{Pto2}$ is an existence percentage of $PtO_2$.

Now, the present invention will be described in more detail. The methane combustion catalyst containing a $Pt/SnO_2$-based catalyst of the present invention has a constitution basically the same as that of conventional $Pt/SnO_2$-based catalysts (Patent Documents 1 and 2), and platinum and iridium are supported on a carrier containing tin oxide. In the following description, each constitution of the catalyst will be described as well as a method for producing the catalyst will be described in detail.

(A) Constitution of Methane Combustion Catalyst of the Present Invention

As described above, a characteristic of the present invention against the conventional $Pt/SnO_2$-based catalyst is the oxidized state of supported platinum. Now, this characteristic will be cleared, and platinum, iridium and a carrier contained in the methane combustion catalyst of the present invention will be described.

(A-1) Platinum

The catalyst of the present invention is characterized by the oxidized state of platinum as described above. In the present invention, the oxidized state of platinum is specified based on an analysis result obtained by X-ray photoelectron spectroscopy (XPS). XPS is a method capable of analyzing types of bonding states and ratios (existence percentages) occupied by the respective bonding states in atoms contained in an analysis target, and hence is applied in the present invention. Specifically, based on a platinum 4f (Pt4f) spectrum observed through analysis of the catalyst by XPS, the oxidized state of platinum is specified from detection intensities at binding energies respectively corresponding to the respective bonding states. Here, in the platinum 4f spectrum, a peak of the metal Pt appears in a range of 71.0 eV to 72.0 eV, a peak of PtO appears in a range of 72.8 eV to 73.2 eV, and a peak of $PtO_2$ appears in a range of 74.6 eV to 75.0 eV. The existence percentages $R_{Pt}$, $R_{PtO}$, and $R_{PtO2}$ of the respective states of platinum are calculated from peak areas of the respective states.

In the present invention, based on the existence percentages $R_{Pt}$, $R_{PtO}$, and $R_{PtO2}$ of the respective states of platinum, the ratio $R_{TO}$ of platinum oxides to metal platinum according to Expression 1 described above is required to be 8.00 or more. As the ratio $R_{TO}$ of platinum oxides higher, a ratio of platinum atoms in the oxidized state is higher. In a catalyst having the $R_{TO}$ of less than 8.000, the oxidized state of platinum is insufficient, and hence the catalyst is largely affected by sulfur oxide contained in an exhaust gas, and is inferior in the activity for methane combustion. It is deemed that the $R_{TO}$ preferably has a value as high as possible, but it is realistically difficult to oxidize all platinum atoms, and hence the upper limit of the $R_{TO}$ is preferably 16.00.

In the present invention, in order to increase the ratio $R_{TO}$ of platinum oxides as described above, it is necessary to finely and uniformly disperse platinum atoms in a step of supporting platinum on a tin oxide carrier. In addition, the value of the ratio $R_{TO}$ of platinum oxides is affected by an operation performed from the supporting step to a burning step. A method for setting the $R_{TO}$ in a preferable range will be described later.

In the methane combustion catalyst of the present invention, the existence percentage $R_{Pto}$ of PtO and the existence percentage $R_{Pto2}$ of $PtO_2$ are not especially limited. In the present invention, however, it is likely that the value of $R_{Pto2}$ is equal to or larger than the value of $R_{Pto}$, and that $R_{Pto2}/R_{Pto} \geq 1$.

A supported amount of platinum in the methane combustion catalyst of the present invention is preferably 2.0% by mass or more and 15% by mass or less in terms of metal platinum on a mass basis with respect to the total mass of the catalyst. The supported amount of platinum is more preferably 4.0% by mass or more and 15% by mass or less. These supported amounts of platinum of 2.0% by mass or more and 15% by mass or less, and 4.0% by mass or more and 15% by mass or less correspond to a target supported amount.

(A-2) Iridium

In the methane combustion catalyst of the present invention, iridium works as a promoter for improving durability. Iridium is also in the form of oxide in the methane combustion catalyst. Iridium oxide has a function to retain the oxidized state of platinum by supplying oxygen to platinum metalated by sulfur oxide. In the methane combustion catalyst of the present invention, the oxidized state of iridium is not especially limited. According to examination made on iridium by the present inventors, it has been confirmed that most of supported iridium is oxidized. As described later, there is no need to employ, for iridium oxidation, strict conditions as those employed for changing platinum to platinum oxides.

A supported amount of iridium in the methane combustion catalyst of the present invention is preferably 0.1% by mass or more and 5.0% by mass or less in terms of metal iridium with respect to the total mass of the catalyst. The supported amount of iridium is more preferably 0.2% by mass or more and 2.0% by mass or less.

(A-3) Tin Oxide Carrier

The tin oxide carrier is an essential constitution not only because of the original function of a carrier for holding catalyst particles in a dispersed state but also for imparting activity for methane combustion to platinum (platinum oxides) that is a catalyst particle. In addition, as described above, the present inventors have discussed that the tin oxide carrier has an effect of supplying oxygen to iridium. Therefore, the tin oxide carrier is deemed as a significant constitution also in retaining the durability of the catalyst by iridium oxide.

As a form of the tin oxide carrier, one according with the form of the methane combustion catalyst is employed. Here, the form of the methane combustion catalyst can be any one of shapes of a grain, a granule, a pellet, and a tablet. In such a methane combustion catalyst, the tin oxide carrier is also similarly in the shape of a grain, a granule, a pellet, or a tablet. Such a tin oxide carrier has a specific surface area of preferably 10 $m^2/g$ or more and 27 $m^2/g$ or less, and more preferably 11 $m^2/g$ or more and 15 $m^2/g$ or less.

As the form of the methane combustion catalyst, there are also many examples of application in which the methane combustion catalyst is supported on an appropriate support. As the support, supports in any one of the shapes of a plate, a cylinder, a sphere and a honeycomb are known. In such a catalyst, tin oxide is applied/coated on a support as what is called a wash coat to form a tin oxide carrier. When the tin oxide carrier is thus applied on the support, a proper amount of the tin oxide carrier is preferably 250 g/L or more and 400 g/L or less based on the volume of the support. When the amount of the carrier is as small as less than 250 g/L, dispersion of platinum and iridium may be deteriorated, which may make sufficient methane combustion difficult. On the other hand, when the amount of the carrier is excessive and beyond 400 g/L, a region not in contact with processing gas is formed, and efficiency of methane combustion is lowered also in this case. The specific surface area of the tin oxide carrier in such a form is also preferably the same as the specific surface area of the carrier in the shape of a pellet or the like described above.

(B) Method for Producing Methane Combustion Catalyst of the Invention

Next, a method for producing a catalyst of the present invention will be described. The methane combustion catalyst of the present invention is produced by causing platinum and iridium to be supported on a tin oxide carrier. In this regard, the catalyst is the same as that of the conventional technique, and as the method for producing the catalyst of the present invention, a conventional method can be basically applied. Here, for a conventional methane combustion catalyst, an impregnation method is applied. The impregnation method is a known method for producing a catalyst in which a carrier is impregnated with a solution of a noble metal salt (noble metal compound) to be supported, and the resultant is subjected to a burning heat treatment for precipitating the noble metal on the carrier.

The present invention reveals, however, that it is necessary, for improving the initial activity of a $Pt/SnO_2$-based catalyst, to increase a proportion of the amount of platinum to be changed to platinum oxides working as the activity source. For ensuring the durability of the catalyst, it is also necessary to finely disperse platinum at the stage of the production of the catalyst as well as to make the effect of iridium effective by supporting iridium close to platinum. The present inventors examined a method for producing a catalyst capable of satisfying these requirements, and have found that it is necessary to strictly set impregnation procedures for a noble metal salt solution in the impregnation method, drying conditions employed after the impregnation, and a temperature employed in the burning heat treatment.

Specifically, the method for producing a methane combustion catalyst of the present invention includes a first supporting step of impregnating a carrier of tin oxide with a platinum salt solution, and a first burning step of burning the carrier after the first supporting step, a second supporting step of impregnating the carrier after the first burning step with an iridium salt solution and a second burning step of burning the carrier after the second supporting step, wherein in the first supporting step, the carrier is impregnated, a plurality of times, with a platinum salt solution having a smaller platinum content than a platinum salt solution containing a target supported amount of platinum, and the carrier after impregnation is dried at a temperature of 60° C. or more and 150° C. or less after every time of the impregnation performed a plurality of times to provide a step of impregnating the target supported amount of platinum, and then a heating temperature in the first burning step is set to 350° C. or more and 500° C. or less.

As described above, the catalyst production method of the present invention basically employs the impregnation method, and the process of impregnation with a noble metal salt solution and the process of a burning heat treatment are respectively improved. Now, the respective steps of the present invention will be described.

(B-1) Pre-Supporting Step (Optional Step)

As a step of providing a tin oxide carrier in accordance with the form of a methane combustion catalyst, preparation of tin oxide in any of various forms, application of a tin oxide slurry on a support and the like can be performed. An example of the preparation of tin oxide includes a heat treatment for adjusting a specific surface area. In this heat treatment, tin oxide in the form of a powder, a grain, a granule, a pellet, or a tablet is preferably burnt in air at a temperature of 450° C. or more and 700° C. or less. When the methane combustion catalyst is supported on a honeycomb support or the like, a tin oxide powder is formed into a slurry to be applied on the support. The tin oxide slurry can be prepared by mixing the tin oxide powder having been subjected to the heat treatment described above with a binder using water or an organic solvent as a dispersion medium. For applying the tin oxide slurry on the support, any of various known methods such as air blowing, spraying, dipping and the like can be applied.

(B-2) Platinum and Iridium Supporting Step

Platinum and iridium are supported on the tin oxide carrier through impregnation with noble metal salt solutions of these noble metals, and a burning heat treatment. In the present invention, platinum and iridium are separately supported. This is because a state where platinum (platinum oxides) and iridium are close to each other can be easily obtained when platinum (platinum oxides) is supported, before supporting iridium, in a fine and dispersed state, and iridium is then supported. In this respect, simultaneous supporting of platinum and iridium using a mixed solution thereof is allowed in the conventional method, but the simultaneous supporting is not employed in the present invention.

(B-2-1) Platinum Supporting Step (First Supporting Step) and Burning Step (First Burning Step)

In the present invention, the platinum supporting step is a significant step for dispersedly supporting fine platinum particles, and highly efficiently changing platinum to platinum oxides. In the present invention, as described above, in supporting platinum, the tin oxide carrier is impregnated, a plurality of times, with a platinum salt solution having a smaller platinum content than a platinum salt solution containing a target supported amount of platinum until the target carrier amount is reached (hereinafter, which operation is also referred to as divided supporting). In the present invention, a drying treatment is also required to be performed under prescribed conditions after every time of the impregnation in the divided supporting.

Examples of the platinum salt solution for impregnating the tin oxide carrier include a platinum nitrate aqueous solution, a platinum chloride aqueous solution, and a platinum acetate aqueous solution as well as platinum complex solutions such as tetraammineplatinum salt solution, a dinitrodiamine platinum-ammonia aqueous solution, and a dinitrodiamine platinum-ethanolamine solution. Among these platinum salt solutions, a dinitrodiamine platinum-ammonia aqueous solution, a dinitrodiamine platinum-ethanolamine solution, and platinum nitrate aqueous solution are preferred. A method for impregnating the tin oxide carrier with the platinum salt solution is not especially limited, and any one of spraying, dripping, and dipping may be employed.

It is for refinement and high dispersion of platinum that the divided supporting is essential for supporting platinum in the present invention. If a platinum salt solution with a platinum concentration corresponding to the target supported amount is impregnated at once, platinum (platinum salt) may be supported unevenly, and thus dispersion is deteriorated. When a dilute platinum salt solution is impregnated repeatedly, refined platinum can be highly dispersedly supported. A combination of this divided supporting and the drying treatment described later is necessary for fine dispersion of platinum, and makes contribution to generation of platinum oxides in the subsequent burning step.

The platinum content in the platinum salt solution to be impregnated in the divided supporting of the present invention may be different among respective impregnation operations, but a platinum salt solution having a uniform platinum content is preferably impregnated. The number of times of performing the impregnation in the divided supporting depends on the target supported amount, and is preferably approximately 3 to 5 times. Therefore, assuming that the target supported amount is M, the platinum content in a platinum salt solution to be impregnated in one impregnation operation is preferably M/3 to M/5.

In the present invention, the drying treatment is performed after every impregnation operation performed a plurality of times in the divided supporting. The drying treatment is a treatment in which moisture/crystal water contained in the carrier after the impregnation is evaporated/removed to fix platinum salt on the carrier. The drying treatment is essential because if the burning heat treatment at a high temperature is performed in a state where moisture remains, platinum may be moved by the moisture to deteriorate the dispersion. It should be noted in the drying treatment that the moisture is removed without decomposing platinum salt having been adsorbed on the carrier through the impregnation treatment. If platinum salt is decomposed in the drying treatment performed after every impregnation treatment in the divided supporting, platinum generated by the decomposition is fixed, and platinum salt impregnated in the next impregnation treatment is likely to adsorb on the fixed platinum to be agglomerated. Due to such agglomeration of platinum salt, the dispersion of platinum (platinum oxides) of the catalyst is deteriorated. Therefore, it is necessary, in the drying treatment, to perform heating at a temperature where platinum salt is not decomposed with moisture effectively evaporated/removed.

Specifically, it is necessary to perform heating at a temperature of 60° C. or more and 150° C. or less in the drying treatment. At less than 60° C., evaporation of moisture is so slow that a treatment time is excessive. On the other hand, over 150° C., platinum salt may be decomposed. A treatment time of the drying treatment is adjusted depending on a water content of the carrier, but it is preferred to perform heating at a temperature within the above-described range for at least 30 minutes or more. The upper limit of the drying time needs not be especially limited, but is preferably 120 minutes or less in consideration of production efficiency.

In the present invention, the impregnation with a platinum salt solution and the drying are performed a plurality of times until the target supported amount of platinum salt is supported by the above-described divided supporting, and then the burning step is performed. This burning step is a treatment for generating platinum oxides working as the activity source by decomposing platinum salt. A heating temperature in the first burning step is 350° C. or more and 500° C. or less. At less than 350° C., the generation of platinum oxides is insufficient. Over 500° C., platinum oxides thus generated are decomposed into metal platinum. The heating temperature is more preferably 380° C. or more and 480° C. or less. A treatment time of the burning step is preferably 1 hour or more and 5 hours or less. An atmosphere in the burning step is not especially limited as long as it is an oxidizing atmosphere such as air.

The burning step and the drying treatment (the drying treatment performed after the final impregnation treatment in the divided supporting) can be performed in conjunction. In other words, after performing heating at a temperature of 60° C. or more and 150° C. or less for a prescribed time period in the drying treatment, the temperature can be increased again up to the burning temperature for performing heating for the burning treatment. In this case, heating may be performed at the same temperature increase rate straight from the drying temperature to the burning temperature. Alternatively, the temperature increase rate may be adjusted during increase from the drying temperature to the burning temperature. Regarding behavior in change of platinum salt into platinum oxides after the drying treatment, the platinum salt decomposes at from 150° C. to about 300° C., and becomes oxides at about 300° C. or more, and at over 500° C., the oxides decompose to metal platinum. Therefore, from the temperature of the drying treatment to 300° C., a low temperature increase rate (1 to 3° C./min) is employed to cause the decomposition of platinum salt to proceed, and a comparatively high temperature increase rate (5 to 10° C./min) is employed from 300° C. to 500° C. so that platinum oxides can be efficiently and stably generated. It is, however, not essential to perform such stepwise adjustment of the temperature increase rate, and platinum oxides can be formed even when the heating is performed straight from the drying temperature to the burning temperature as described above. The temperature increase rate employed in such a case is preferably approximately 1 to 3° C./min.

Through the platinum burning step (first burning step) described above, platinum oxides are supported on the carrier. As is obvious from the above description, although the impregnation with a platinum salt solution is performed a plurality of times in the present invention, the burning step is performed only once after the final impregnation, and is not performed after every time of the impregnation. If the burning is performed after every time of the impregnation in the divided supporting, platinum salt may be adsorbed/bonded to platinum oxides generated by the burning, and sintering may be caused when the resultant is burnt, to generate coarse oxides.

(B-3) Iridium Supporting Step (Second Supporting Step) and Burning Step (Second Burning Step)

After performing the supporting of platinum on the tin oxide carrier and the burning, supporting of iridium and burning are performed. Also the supporting of iridium is performed through impregnation with an iridium salt solution (second supporting step), but differently from the supporting of platinum, the supporting is performed not by the divided supporting but by performing the impregnation treatment once.

Examples of the iridium salt solution for impregnation for supporting iridium include halogenated iridium aqueous solutions such as an iridium chloride aqueous solution, and an iridium nitrate aqueous solution, halogenated iridate aqueous solutions such as a hexachloroiridate aqueous solution, and a hexaammineiridium aqueous solution. A method for impregnating the iridium salt solution is not also especially limited, and any one of spraying, dripping, and dipping may be employed.

After the impregnation treatment of the iridium salt solution, a drying treatment is performed as in that for platinum. In the drying treatment for iridium salt, strict conditions as those for platinum in consideration of decomposition of platinum salt are not necessary. However, the drying treatment is preferably performed at a temperature of 60° C. or more and 150° C. or less as in that for platinum. As for a drying time, heating is performed preferably for 30 minutes or more and 2 hours or less.

Then, through the burning step (second burning step), precipitation of iridium from iridium salt and generation of iridium oxide are performed. According to the present inventors, there is no need to strictly set burning conditions for iridium differently from platinum. This is because oxide is comparatively easily generated from iridium as compared with platinum, and the oxide is unlikely to be decomposed. In the burning of iridium, heating is performed preferably at 350° C. or more. An atmosphere for the burning step for iridium is also not especially limited as long as it is an oxidizing atmosphere such as air. If the burning step for iridium is performed at an excessively high temperature, however, platinum oxides may be decomposed. Therefore, also in the burning step for iridium, the upper limit temperature is preferably 500° C. A burning time is preferably similar to that employed in supporting platinum.

Through the iridium supporting step and the burning step described above, the methane combustion catalyst of the present invention is produced.

(C) Methane Combustion Method with Methane Combustion Catalyst of the Invention

A methane combustion method applying the methane combustion catalyst of the present invention described above is basically the same as a conventional method. A target of the methane combustion method of the present invention is a combustion exhaust gas containing methane as well as sulfur oxide. In addition to methane and sulfur oxide, other hydrocarbons such as ethane and propane, carbon monoxide, and combustible components such as oxygen, an oxygen-containing compound, and nitrogen oxide may be contained.

In combustion of methane in the combustion exhaust gas, the gas to be treated is caused to pass through a combustion device provided with the methane combustion catalyst of the present invention to be brought into contact with the methane combustion catalyst. As the combustion device, a known device can be applied, and for example, a fixed bed flow reactor or the like can be applied. An amount of the catalyst used in such a combustion device is generally set in terms of a gas hourly space velocity (GHSV). In the present invention, the space velocity is preferably 80,000 $h^{-1}$ or less for ensuring a methane combustion rate. Catalytic activity is improved by lowering the space velocity, and hence the space velocity is preferably as low as possible. In consideration of the catalytic activity, economic performance and pressure loss, however, the space velocity is preferably 1,000 $h^{-1}$ or more.

A temperature for heating the methane combustion catalyst for purifying a combustion exhaust gas, namely, a reaction temperature, is 340° C. or more and 500° C. or less. The reaction temperature is more preferably 350° C. or more and 475° C. or less.

Advantageous Effects of Invention

As described so far, the present invention relates to a $Pt/SnO_2$-based catalyst (Pt—Ir/$SnO_2$ catalyst) that is a methane combustion catalyst, in which platinum oxides working as an activity source are effectively generated on a tin oxide carrier, and thus methane combustion activity is improved as compared with that of a conventional $Pt/SnO_2$-based catalyst. According to the present invention, owing to improvement of initial activity of the methane combustion catalyst, a combustion exhaust gas can be treated for a long period of time as compared with conventional techniques.

DETAILED DESCRIPTION OF THE PREFERRED EMBODIMENTS

Figure 1:
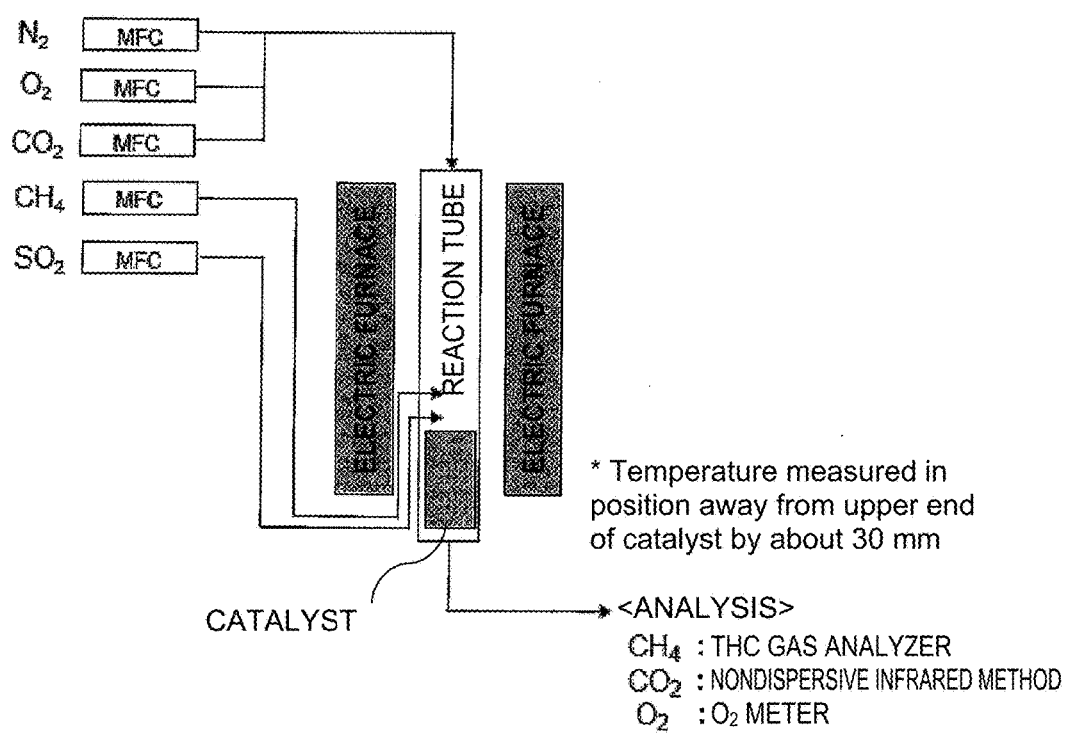
FIG. 1 is a schematic diagram illustrating a structure of a test device for a methane combustion test conducted in the present embodiment.

First Embodiment: An embodiment of the present invention will now be described. In the present embodiment, a Pt—Ir/$SnO_2$ catalyst was produced following production process (Basic Production Process) according to a method for producing a methane combustion catalyst of the present invention. Also, Pt—Ir/SnO$_2$ catalysts were produced through production processes (Comparative Production Processes 1 and 2) referring to a conventional technique (Patent Document 2). Each catalyst was subjected to XPS analysis to measure a ratio of platinum oxides ($R_{TO}$), and a combustion test of a gas containing methane and sulfur oxide was performed to measure/evaluate a methane conversion.

[Basic Production Process]

The production process of the methane combustion catalyst of the present embodiment was as follows. A commercially available tin oxide powder was burnt at 600° C. A commercially available SnO$_2$ sol was mixed/ground, as a binder, with the burnt tin oxide powder with a ball mill to produce a tin oxide slurry. The tin oxide slurry was applied by air blowing on a commercially available cordierite honeycomb (manufactured by NGK Insulators, Ltd.: ϕ25.4 mm×50 mmL) to obtain a tin oxide carrier (specific surface area of tin oxide: 12.09 m$^2$/g). At this point, the number of times of performing air blowing was adjusted to adjust the mass of the tin oxide carrier.

On the tin oxide carrier (honeycomb support), platinum was dividedly supported. As a platinum salt solution to be impregnated in the divided supporting, a dinitrodiamine platinum-ammonia aqueous solution was used. As the dinitrodiamine platinum-ammonia aqueous solution, one obtained by dissolving dinitrodiamine platinum in ammonia water, and adjusting the resultant to pH 12 was used. In the present embodiment, the number of times of the divided supporting was set to 4 times, and a platinum concentration in a platinum salt solution used in every time was adjusted with respect to a target supported amount. Through the impregnation with the platinum salt solution of the respective times, the platinum salt solution was air blown onto the tin oxide carrier. After the impregnation with the platinum salt solution, a drying step was performed. In the drying step, the tin oxide carrier after the impregnation was put in a drier machine kept at 110° C., and held therein for 30 minutes as a drying treatment. The impregnation with the platinum solution and the drying step were performed 4 times.

Then, after the impregnation with the platinum salt solution and the drying, the resultant tin oxide carrier was burnt. The temperature was increased from the drying temperature (110° C.) in the final drying step in the supporting step described above at a temperature increase rate of 1° C./min to 275° C., and was kept at this temperature for 3 hours. A heating step described so far was performed in consideration of decomposition of platinum salt. Then, the temperature was increased from 275° C. at a temperature increase rate of 1° C./min to a set burning temperature, and was kept at this temperature for 3 hours for a burning treatment. In this manner, a tin oxide carrier supporting platinum oxides was produced.

On the tin oxide carrier (platinum supported), iridium was supported, and the resultant was burnt. Here, as an iridium salt solution, a hexachloroiridate aqueous solution was used, and a target supported amount was adjusted in accordance with an iridium concentration therein. A method for impregnating the iridium salt solution was performed similarly to that with the platinum salt solution, and the total amount of the solution was impregnated at one time. After the impregnation of the iridium salt, drying was performed at 110° C. for 0.5 hours, and the temperature was increased from this temperature at a temperature increase rate of 5° C./min to a burning temperature the same as that for platinum, and was kept at this temperature for 3 hours for burning treatment. Through these steps, the methane combustion catalyst of the present embodiment was produced.

In the present embodiment, the catalyst was produced in accordance with the above-described Basic Process, with the supported amount of platinum on a mass basis with respect to the entire catalyst set to 8.0% by mass, and with an iridium supported amount set to 0.8% by mass. At this time, the number of times of the divided supporting in the platinum supporting step was set to 4 times, and a platinum salt solution corresponding to 2% by mass was supported/dried every time, and the burning treatment was performed after the platinum supporting. In the present embodiment, five types of methane combustion catalysts were produced with a burning temperature employed after the platinum supporting respectively set to 350° C. (Example 1), 400° C. (Example 2), 450° C. (Example 3), 500° C. (Example 4), and 650° C. (Reference Example 1). It is noted that a burning temperature employed after the iridium supporting was the same temperature as the burning temperature employed after the platinum supporting.

[Comparative Production Process 1]

As a comparative example (Comparative Example 1) for the production process of a methane combustion catalyst of the present embodiment, referring to the conventional technique (Patent Document 2), a catalyst was produced by performing the drying step and the burning treatment respectively at higher temperatures than in Basic Production Process. As compared with Basic Production Process of the present embodiment, the divided supporting (4 times) was performed, and as a drying treatment after every time of the impregnation, heating was performed at 175° C. for 3 hours, and thereafter, heating was performed at 275° C. for 3 hours. In the burning step after the final drying treatment, heating was performed at 550° C. for 3 hours. Except for these drying treatment and burning treatment, the platinum supporting step was the same as that in Basic Production Process of the present embodiment. The iridium supporting step and the burning step were performed in the same manner as in Basic Production Process. The supported amounts of platinum and iridium were the same as those of Example 1 and the like.

[Comparative Production Process 2]

As another comparative example (Comparative Example 2) to the present embodiment, a catalyst supporting platinum without employing the divided supporting was produced. The supported amounts of platinum and iridium were the same as those of Example 1 and the like. In this Comparative Production Process 2, as compared with Basic Production Process of the present embodiment, the entire amount of a platinum salt solution containing a target supported amount of platinum was impregnated in a tin oxide carrier through one operation without employing the divided supporting. After the impregnation with the platinum salt solution, drying and burning were performed. In the drying treatment, heating was performed at a temperature of 110° C. for 1 hour, and in the burning treatment, heating was performed at 450° C. for 3 hours. A temperature increase rate in each treatment was the same as that employed in Basic Production Process. Thereafter, the iridium supporting step and the burning step were performed in the same manner as in Basic Production Process.

Measurement of Ratio of Platinum Oxides by XPS

Each of the methane combustion catalysts of the respective examples and comparative examples produced by the above-described various methods was subject to XPS analysis to obtain a ratio ($R_{TO}$) of platinum oxides. In the XPS analysis, each catalyst was crushed with an agate mortar to prepare samples, and the XPS analysis was performed under the following conditions. In the XPS analysis, survey scan and narrow scan were performed to obtain a Pt4f spectrum and an Ir4f spectrum.

Figure 2:
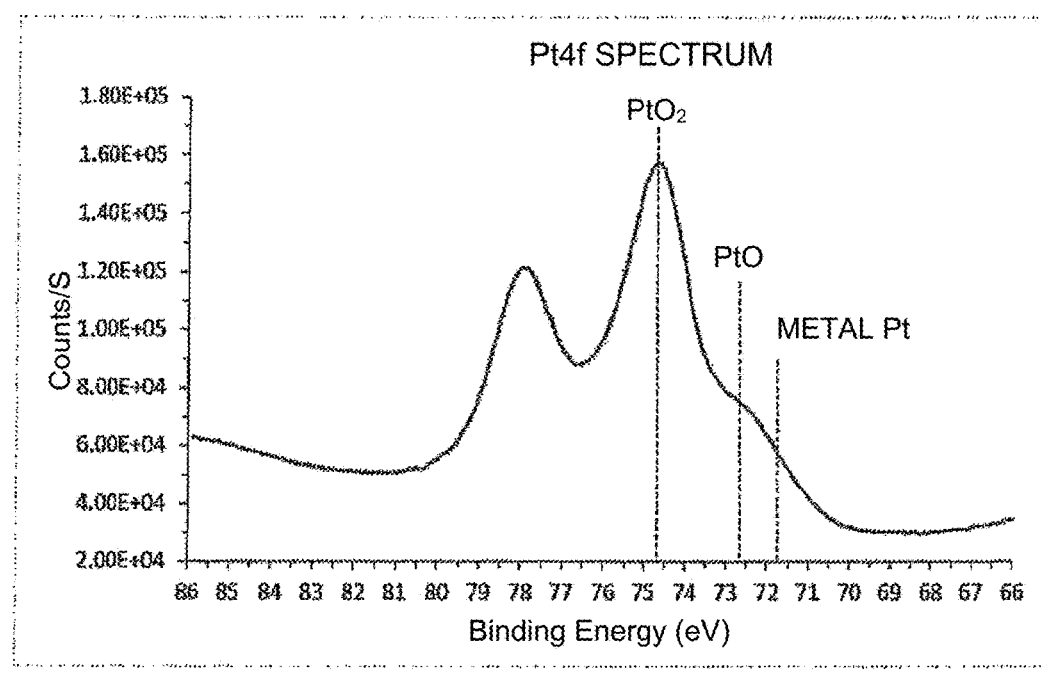
FIG. 2 is a diagram illustrating a Pt4f spectrum and an Ir4f spectrum measured by XPS analysis of a methane combustion catalyst of Example 2 in First Embodiment.
Figure 2:
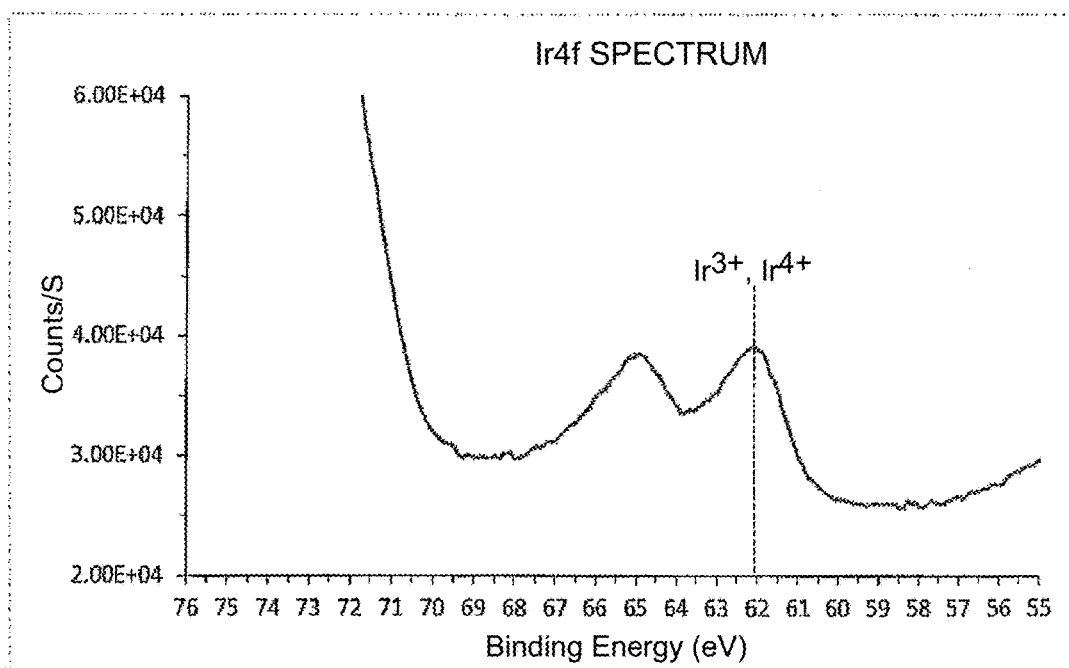

Analyzer: K-Alpha+ manufactured by Thermo Fisher Scientific
Irradiation X-ray: Al Kα ray for single crystal spectroscopy
X-ray spot diameter: 400 μm
Neutralizing electron gun: used
Normalization of binding energy: normalized assuming that C—C and C—H have 2884.6 eV FIG. 2 illustrates a Pt4f spectrum and an Ir4f spectrum measured by narrow scan of Example 2 (platinum supported amount: 8.0% by mass, iridium supported amount: 0.8% by mass, burning temperature: 400° C.). In the XPS spectrum of platinum, a peak top was obtained in a range of binding energy of 71 to 75 eV. In this range, as platinum oxides, a peak in a range of 72.8 to 73.2 eV was identified as PtO, and a peak in a range of 74.6 to 75 eV corresponded to $PtO_2$. Referring to the spectrum of iridium of FIG. 2, iridium was in the form of $Ir^{3+}$ or $Ir^{4+}$, and a peak of metal iridium was not found. Based on this, it is understood that substantially all iridium was present in the form of iridium oxide.

For calculating the existence percentage of platinum oxides, the XPS profile thus obtained was subjected to waveform separation processing to measure a peak area representing each of the states of $PtO_2$, PtO, metal Pt, and iridium (oxide). Also, peak areas of respective elements of oxygen (O), tin (Sn) and carbon (C) were simultaneously measured. Then, the peak areas of the respective components of Pt, Ir, O, Sn and C were corrected with respective relative sensitivity factors (RSF), and with a total peak area of the respective components used as a reference (100), the existence percentages of $PtO_2$, PtO and metal Pt were calculated. Furthermore, based on the existence percentages of $PtO_2$, PtO and metal Pt thus calculated, a ratio ($R_{TO}$) of platinum oxides to metal platinum was calculated. It is noted that analysis software (Advantage-Thermo) was used in the above analysis.

Evaluation Test of Methane Combustion Performance

Next, each of the thus produced methane combustion catalysts was used for performing a test for performance evaluation. In this evaluation test, each catalyst was set in a test device of FIG. 1 simulating a fixed bed reactor, and a test gas was allowed to pass therethrough to measure a methane conversion. Test conditions were as follows:

Reaction temperature (catalyst temperature): 400° C.
Test gas composition:
  $CH_4$: 2000 ppm
  $CO_2$: 5%
  $O_2$: 10%
  $H_2O$: 10%
  $SO_2$: 1 ppm
  $N_2$: balance
Space velocity (GHSV): 80,000 $h^{-1}$ The test gas was caused to pass through the catalyst under the above-described conditions, and the composition of an exhaust gas was analyzed at 5 hours after starting the test to measure a methane conversion. For the measurement of the methane conversion, the exhaust gas was analyzed with an FID THC analyzer, a nondispersive infrared analyzer, and a magnetic oxygen analyzer to obtain $CH_4$, $CO_2$ and $O_2$ concentrations. Then, the methane conversion was calculated from the measured values in accordance with the following expression:

[Expression 2]

$$CH_4 \text{ conversion } (\%) = \frac{((CH_4 \text{ concentration before reaction}) - CH_4 \text{ concentration after reaction}))}{(CH_4 \text{ concentration before reaction})} \times 100$$

Results of the evaluation test of the methane combustion performance performed in the present embodiment, and results of the ratio ($R_{TO}$) of platinum oxides obtained by the XPS analysis of the respective methane combustion catalysts are shown in Table 1.

TABLE 1

| | Production Process | Pt [wt %] | Ir [wt %] | SnO2 [wt %] | Burning Temperature [° C.] | Estimated Assignment | Existence percentage | Pt Oxide Ratio ($R_{TO}$) | Methane Conversion [%] |
|---|---|---|---|---|---|---|---|---|---|
| Example 1 | Basic Process | 8.0 | 0.8 | 91.2 | 350 | Metal Pt | 0.5 | 15.60 | 97.8 |
| | | | | | | PtO | 1.7 | | |
| | | | | | | PtO2 | 6.1 | | |
| | | | | | | Ir3+, Ir4+ | 0.8 | — | |
| Example 2 | | | | | 400 | Metal Pt | 0.6 | 12.00 | 94.7 |
| | | | | | | PtO | 1.8 | | |
| | | | | | | PtO2 | 5.4 | | |
| | | | | | | Ir3+, Ir4+ | 0.8 | | |
| Example 3 | | | | | 450 | Metal Pt | 0.5 | 8.60 | 92.0 |
| | | | | | | PtO | 1.2 | | |
| | | | | | | PtO2 | 3.1 | | |
| | | | | | | Ir3+, Ir4+ | 0.5 | — | |
| Example 4 | | | | | 500 | Metal Pt | 0.8 | 8.25 | 84.7 |
| | | | | | | PtO | 1.7 | | |
| | | | | | | PtO2 | 4.9 | | |
| | | | | | | Ir3+, Ir4+ | 0.7 | — | |
| Reference Example 1 | | | | | 650 | Metal Pt | 0.9 | 3.22 | 24.3 |
| | | | | | | PtO | 0.8 | | |
| | | | | | | PtO2 | 2.1 | | |
| | | | | | | Ir3+, Ir4+ | 0.3 | | |

TABLE 1-continued

|  | Production Process | Pt [wt %] | Ir [wt %] | SnO2 [wt %] | Burning Temperature [° C.] | Estimated Assignment | Existence percentage | Pt Oxide Ratio ($R_{TO}$) | Methane Conversion [%] |
|---|---|---|---|---|---|---|---|---|---|
| Comparative Example 1 | Comparative Process 1 |  |  |  | 550 | Metal Pt<br>PtO<br>PtO2<br>Ir3+, Ir4+ | 0.5<br>0.6<br>3.1<br>0.5 | 7.40<br><br><br>— | 57.9 |
| Comparative Example 2 | Comparative Process 2 |  |  |  | 450 | Metal Pt<br>PtO<br>PtO2<br>Ir3+, Ir4+ | 1.2<br>2.1<br>2.5<br>1 | 3.83<br><br><br>— | 75.9 |

Referring to Table 1, the methane combustion catalysts of Examples 1 to 4 had a methane conversion beyond 80%. As compared with the methane combustion catalysts of Comparative Examples 1 and 2, it is deemed that these catalysts have extremely good activity. Regarding the ratio ($R_{TO}$) of platinum oxides measured by XPS, the methane combustion catalysts of Examples 1 to 4 all had a ratio of 8.00 or more, and it is thus understood that platinum oxides were generated at a high ratio. This can be also confirmed from the Pt4f spectrum of FIG. 2. On the other hand, in the catalyst of Reference Example 1 obtained with a high burning temperature (650° C.), the ratio ($R_{TO}$) of platinum oxides measured by XPS is as low as less than 8.00. The methane conversion thereof was lower than those of the respective examples.

Although platinum oxides were sufficiently generated also in the methane combustion catalysts of Comparative Examples 1 and 2, the ratios were obviously lower than those of Examples 1 to 4. It is presumed that catalytic activity is basically in proportion to the supported amount of platinum, but the supported platinum amount was the same in the examples and the comparative examples, and hence, it is presumed that the activity was improved owing to the increase of the ratio of platinum oxides.

It can be understood, from a difference in the ratio of platinum oxides, that the drying treatment performed after the impregnation with the platinum salt solution in Basic Process of the present embodiment is significant, and that temperature control in the burning step is significant. In Comparative Production Process 1 employed for producing the catalyst of Comparative Example 1, the temperature in the drying treatment was high, and the burning temperature was also high. It is presumed that platinum salt was decomposed through the drying treatment performed at a high temperature, and hence platinum oxides were insufficiently generated in the subsequent burning, and in addition, that platinum oxides were decomposed also due to the high burning temperature. In Comparative Production Process 2 employed for producing the catalyst of Comparative Example 2, the divided supporting was not employed, but the platinum salt solution containing the target supported amount (8.0% by mass) of platinum was supported at one time. Therefore, it is presumed that dispersion of platinum was inferior, and that platinum oxides were insufficiently generated.

Second Embodiment: In the present embodiment, methane combustion catalysts different in the platinum supported amount and the iridium supported amount were produced to evaluate performances. Here, through the same steps as those of Basic Production Process of First Embodiment, a plurality of methane combustion catalysts were produced with a platinum concentration in a platinum salt solution and an iridium concentration in an iridium salt solution changed for adjusting the supported amounts of the noble metals. A methane combustion catalyst for comparison was also produced based on Comparative Production Process 1. Then, a performance evaluation test similar to that of First Embodiment was performed. In the performance evaluation test, two reaction temperatures (340° C. and 400° C.) were employed. Results thus obtained are shown in Table 2.

TABLE 2

|  | Production Process | Pt [wt %] | Ir [wt %] | SnO2 [wt %] | Reaction Temperature [° C.] | Methane Conversion [%] |
|---|---|---|---|---|---|---|
| Example 5 | Basic Process | 2.1 | 0.2 | 97.6 | 340 | 3.0 |
| Example 6 |  | 4.2 | 0.4 | 95.4 | 340 | 7.4 |
| Example 7 |  | 7.9 | 1.6 | 90.5 | 340 | 12.7 |
| Example 8 |  | 8.0 | 0.4 | 91.6 | 340 | 11.4 |
| Example 9 |  | 8.0 | 0.8 | 91.2 | 340 | 13.4 |
| Example 10 |  | 11.5 | 1.1 | 87.4 | 340 | 12.2 |
| Example 11 |  | 14.7 | 1.5 | 83.8 | 340 | 21.7 |
| Comparative Example 3 |  | 2.8 | 0.3 | 96.9 | 340 | 0 |
| Comparative Example 4 |  | 8.0 | 0.8 | 91.2 | 340 | 0 |
| Example 5 | Basic Process | 2.1 | 0.2 | 97.6 | 400 | 56.8 |
| Example 6 |  | 4.2 | 0.4 | 95.4 | 400 | 76.9 |
| Example 7 |  | 7.9 | 1.6 | 90.5 | 400 | 88.8 |
| Example 8 |  | 8.0 | 0.4 | 91.6 | 400 | 90.0 |
| Example 9 |  | 8.0 | 0.8 | 91.2 | 400 | 87.8 |
| Example 10 |  | 11.5 | 1.1 | 87.4 | 400 | 89.0 |

TABLE 2-continued

|  | Production Process | Pt [wt %] | Ir [wt %] | SnO2 [wt %] | Reaction Temperature [° C.] | Methane Conversion [%] |
|---|---|---|---|---|---|---|
| Example 11 |  | 14.7 | 1.5 | 83.8 | 400 | 89.5 |
| Comparative Example 3 |  | 2.8 | 0.3 | 96.9 | 400 | 15.9 |
| Comparative Example 4 |  | 8.0 | 0.8 | 91.2 | 400 | 57.9 |

Referring to Table 2, the methane combustion catalysts of the comparative examples were extremely poor in the methane combustion activity when the reaction temperature was set to 340° C. On the other hand, the methane combustion catalysts of the examples exhibited the methane combustion activity even when it was 340° C. When the catalysts having the same noble metal supported amounts (Example 9 and Comparative Example 4) were compared, the methane combustion catalyst of the example obviously had higher activity.

When the reaction temperature was increased to 400° C., the methane combustion catalysts of the examples exhibited definite methane combustion activity. In particular, when the platinum supported amount was 4% by mass or more, high activity of 70% or more was exhibited. Even the catalyst having a platinum supported amount of 2.1% by mass (Example 5) exhibited activity equivalent to that of Comparative Example 4 having a platinum supported amount of 8.0% by mass, and hence this catalyst is deemed to be a useful catalyst depending on required performances in consideration of catalyst cost.

Third Embodiment: In the present embodiment, a proper range of a treatment temperature in the burning step performed after the impregnation with the platinum salt solution and drying was checked. Catalysts were produced with the burning temperature after the platinum supporting step set to 350° C. (Example 12), 450° C. (Example 13), 500° C. (Example 14), 550° C. (Reference Example 2), and 600° C. (Reference Example 3) in Basic Production Process of First Embodiment. The temperature in the burning step for iridium was set to the same as that in the burning step for platinum. A methane combustion catalyst for comparison was also produced based on Comparative Production Process 1 (drying temperature: 175° C., burning temperature: 550° C.) (Comparative Example 5). Then, each of the catalysts was subjected to a performance evaluation test in the same manner as that of First Embodiment (reaction temperature of 400° C.). Results thus obtained are shown in Table 3.

Referring to Table 3, the methane combustion catalysts obtained with the burning temperature set to 350° C. (Example 12), 450° C. (Example 13), and 500° C. (Example 14) exhibited a high methane conversion of 90% or more. On the other hand, in the methane combustion catalysts obtained by burning with the burning temperature over 500° C. (550° C.: Reference Example 2, and 600° C.: Reference Example 3), the methane conversion was likely to decrease. Accordingly, it was confirmed, also from the results of the present embodiment, that the treatment temperature in the burning step for platinum is preferably 500° C. or less. However, the methane combustion catalyst of Reference Example 2 obtained by burning at 550° C. had higher activity than the methane combustion catalyst of Comparative Example 5 produced with the same burning temperature. In the production process for the catalyst of Comparative Example 5 (Comparative Production Process 1), the drying temperature after the impregnation with the platinum salt solution was high (175° C.), and hence it is presumed that the activity of Comparative Example 5 was inferior because a difference was caused in generation of platinum oxides by the difference in the drying temperature.

Furthermore, in the present embodiment, methane combustion catalysts of Example 13, Reference Example 2, Reference Example 3, Reference Example 4, and Comparative Example 5 were measured/evaluated for degree of metal dispersion by a CO gas adsorption method. In analysis by the CO gas adsorption method, a sample mass was set to 50 mg, a pre-treatment with He gas flow was performed at 50° C. for 2 hours, and then CO gas adsorption measurement was performed at 50° C. In this evaluation test, a catalyst (Reference Example 4) obtained by applying Basic Production Process with the burning temperature in the burning treatment set to a high temperature (650° C.), and a catalyst (Comparative Example 6) obtained by a production method of Comparative Production Process 2 in which platinum was supported through one impregnation operation without employing the divided supporting were produced, and were similarly evaluated. Measurement results thus obtained are shown in Table 4.

TABLE 3

|  | Production Process | Pt [wt %] | Ir [wt %] | SnO2 [wt %] | Burning Temperature [° C.] | Methane Conversion [%] |
|---|---|---|---|---|---|---|
| Example 12 | Basic | 8.69 | 0.87 | 90.44 | 350 | 97.8 |
| Example 13 | Process | 8.15 | 0.82 | 91.04 | 450 | 92.0 |
| Example 14 |  | 7.89 | 0.79 | 91.32 | 500 | 91.7 |
| Reference Example 2 |  | 8.19 | 0.82 | 91.00 | 550 | 73.5 |
| Reference Example 3 |  | 7.83 | 0.78 | 91.38 | 600 | 59.9 |
| Comparative Example 5 | Comparative Process 1 | 7.92 | 0.80 | 91.28 | 550 | 60.0 |

TABLE 4

| | Production Process | Pt [wt %] | Ir [wt %] | SnO2 [wt %] | Burning Temperature [° C.] | Methane Conversion [%] | CO Adsorption (cm³/g) | Dispersion (%) |
|---|---|---|---|---|---|---|---|---|
| Example 13 | Basic Process | 8.15 | 0.82 | 91.04 | 450 | 92.0 | 0.33 | 6.55 |
| Reference Example 2 | | 8.19 | 0.82 | 91.00 | 550 | 73.5 | 0.20 | 3.99 |
| Reference Example 3 | | 7.83 | 0.78 | 91.38 | 600 | 59.9 | 0.14 | 2.82 |
| Reference Example 4 | | 8.07 | 0.40 | 91.53 | 650 | 24.3 | 0.09 | 1.67 |
| Comparative Example 5 | Comparative Process 1 | 7.92 | 0.80 | 91.28 | 550 | 60.0 | 0.11 | 2.18 |
| Comparative Example 6 | Comparative Process 2 | 9.00 | 0.90 | 90.10 | 450 | 75.9 | 0.17 | 2.92 |

When Example 13 (burning temperature: 450° C.), Reference Example 2 (burning temperature: 550° C.), Reference Example 3 (burning temperature: 600° C.), and Reference Example 4 (burning temperature: 650° C.) of Table 4 were compared, it was understood that the degree of metal dispersion is deteriorated in accordance with the increase of the burning temperature. In the methane combustion catalyst produced by burning at 550° C. to 650° C., it is presumed that the grain size was coarsened due to sintering of a platinum particle resulting from decomposition and metalation of platinum oxides, and hence the degree of metal dispersion was deteriorated.

The catalyst of Comparative Example 5 was inferior in degree of metal dispersion to the catalyst of Example 13 because the drying temperature and the burning temperature were higher. The catalyst of Comparative Example 6 was obtained with the same burning temperature (450° C.) as Example 13, but was produced by supporting the platinum salt solution at one time without employing the divided supporting. It is presumed that since the metal salt solution was not dividedly supported, dispersion of platinum was inferior, and that platinum oxides were insufficiently generated.

INDUSTRIAL APPLICABILITY

A Pt/SnO$_2$-based methane combustion catalyst of the present invention is excellent in methane combustion activity as compared with that of conventional techniques. This is because platinum oxides working as an activity source are efficiently generated in production process. According to the present invention, owing to improvement of initial activity, a combustion exhaust gas can be treated for a long period of time with catalyst poisoning with sulfur oxide suppressed. The methane combustion catalyst of the present invention can be suitably applied to purification of various exhaust gases generated from engines, boilers, and power generation systems using hydrocarbon fuels such as natural gas and city gas. In addition, the present invention is useful for a power generation system such as a cogeneration system and a gas heat pump (GHP).

What is claimed is:

1. A methane combustion catalyst comprising platinum and iridium supported on a tin oxide carrier, and for combusting methane in a combustion exhaust gas containing sulfur oxide,
   wherein a ratio $R_{TO}$ of platinum oxides to metal platinum is 8.00 or more 16 or less, the ratio $R_{TO}$ being based on existence percentages of the metal platinum (Pt) and the platinum oxides (PtO and PtO$_2$) obtained from a platinum 4f spectrum of the methane combustion catalyst measured by X-ray photoelectron spectroscopy (XPS) and calculated in accordance with the following expression:

$$R_{TO}=(R_{PtO}+R_{PtO2})/R_{Pt} \qquad \text{[Expression 1]}$$

wherein $R_{Pt}$ is an existence percentage of the metal platinum (Pt), $R_{PtO}$ is an existence percentage of PtO, and $R_{PtO2}$ is an existence percentage of PtO$_2$, and $R_{PtO2}/R_{PtO}\geq 1$.

2. The methane combustion catalyst according to claim 1, wherein a supported amount of platinum on a mass basis with respect to the entire catalyst is 2.0% by mass or more and 15.0% by mass or less.

3. The methane combustion catalyst according to claim 1, wherein a supported amount of iridium on a mass basis with respect to the entire catalyst is 0.1% by mass or more and 5.0% by mass or less.

4. The methane combustion catalyst according to claim 1, wherein the methane combustion catalyst is in a shape of any one of a grain, a granule, a pellet, and a tablet.

5. The methane combustion catalyst according to claim 1, wherein the methane combustion catalyst is supported on a support in a shape of any one of a plate, a cylinder, a sphere, and a honeycomb.

6. A method for producing the methane combustion catalyst defined in claim 1, comprising:
   a first supporting step of impregnating a carrier of tin oxide with a platinum salt solution, and a first burning step of burning the carrier after the first supporting step; and
   a second supporting step of impregnating the carrier after the first burning step with an iridium salt solution, and a second burning step of burning the carrier after the second supporting step,
   wherein in the first supporting step, the carrier is impregnated, a plurality of times, with a platinum salt solution having a smaller platinum content than a platinum salt solution containing a target supported amount of platinum, and
   the carrier after impregnation is dried at a temperature of 60° C. or more and 150° C. or less after every time of the impregnation performed a plurality of times to provide a step of impregnating the target supported amount of platinum, and then
   a heating temperature in the first burning step is set to 350° C. or more and 500° C. or less.

7. The method for producing the methane combustion catalyst according to claim 6, wherein the method impregnates a platinum salt solution having a uniform platinum content a plurality of times in the first supporting step.

8. The method for producing the methane combustion catalyst according to claim 6, wherein the method sets a heating temperature in the second burning step to 350° C. or more and 500° C. or less.

9. A method for purifying combustion exhaust gas comprising oxidatively removing methane from a combustion exhaust gas containing sulfur oxide,
wherein the method brings the combustion exhaust gas into contact with the methane combustion catalyst defined in claim 1 at a reaction temperature of 340° C. or more and 500° C. or less.

10. The methane combustion catalyst according to claim 2, wherein a supported amount of iridium on a mass basis with respect to the entire catalyst is 0.1% by mass or more and 5.0% by mass or less.

11. The methane combustion catalyst according to claim 2, wherein the methane combustion catalyst is in a shape of any one of a grain, a granule, a pellet, and a tablet.

12. The methane combustion catalyst according to claim 3, wherein the methane combustion catalyst is in a shape of any one of a grain, a granule, a pellet, and a tablet.

13. The methane combustion catalyst according to claim 2, wherein the methane combustion catalyst is supported on a support in a shape of any one of a plate, a cylinder, a sphere, and a honeycomb.

14. The methane combustion catalyst according to claim 3, wherein the methane combustion catalyst is supported on a support in a shape of any one of a plate, a cylinder, a sphere, and a honeycomb.

15. A method for producing the methane combustion catalyst defined in claim 2, comprising:
a first supporting step of impregnating a carrier of tin oxide with a platinum salt solution, and a first burning step of burning the carrier after the first supporting step; and
a second supporting step of impregnating the carrier after the first burning step with an iridium salt solution, and a second burning step of burning the carrier after the second supporting step,
wherein in the first supporting step, the carrier is impregnated, a plurality of times, with a platinum salt solution having a smaller platinum content than a platinum salt solution containing a target supported amount of platinum, and
the carrier after impregnation is dried at a temperature of 60° C. or more and 150° C. or less after every time of the impregnation performed a plurality of times to provide a step of impregnating the target supported amount of platinum, and then
a heating temperature in the first burning step is set to 350° C. or more and 500° C. or less.

16. A method for producing the methane combustion catalyst defined in claim 3 comprising:
a first supporting step of impregnating a carrier of tin oxide with a platinum salt solution, and a first burning step of burning the carrier after the first supporting step; and
a second supporting step of impregnating the carrier after the first burning step with an iridium salt solution, and a second burning step of burning the carrier after the second supporting step,
wherein in the first supporting step, the carrier is impregnated, a plurality of times, with a platinum salt solution having a smaller platinum content than a platinum salt solution containing a target supported amount of platinum, and
the carrier after impregnation is dried at a temperature of 60° C. or more and 150° C. or less after every time of the impregnation performed a plurality of times to provide a step of impregnating the target supported amount of platinum, and then
a heating temperature in the first burning step is set to 350° C. or more and 500° C. or less.

17. A method for producing the methane combustion catalyst defined in claim 4, comprising:
a first supporting step of impregnating a carrier of tin oxide with a platinum salt solution, and a first burning step of burning the carrier after the first supporting step; and
a second supporting step of impregnating the carrier after the first burning step with an iridium salt solution, and a second burning step of burning the carrier after the second supporting step,
wherein in the first supporting step, the carrier is impregnated, a plurality of times, with a platinum salt solution having a smaller platinum content than a platinum salt solution containing a target supported amount of platinum, and
the carrier after impregnation is dried at a temperature of 60° C. or more and 150° C. or less after every time of the impregnation performed a plurality of times to provide a step of impregnating the target supported amount of platinum, and then
a heating temperature in the first burning step is set to 350° C. or more and 500° C. or less.

18. A method for producing the methane combustion catalyst defined in claim 5, comprising:
a first supporting step of impregnating a carrier of tin oxide with a platinum salt solution, and a first burning step of burning the carrier after the first supporting step; and
a second supporting step of impregnating the carrier after the first burning step with an iridium salt solution, and a second burning step of burning the carrier after the second supporting step,
wherein in the first supporting step, the carrier is impregnated, a plurality of times, with a platinum salt solution having a smaller platinum content than a platinum salt solution containing a target supported amount of platinum, and
the carrier after impregnation is dried at a temperature of 60° C. or more and 150° C. or less after every time of the impregnation performed a plurality of times to provide a step of impregnating the target supported amount of platinum, and then
a heating temperature in the first burning step is set to 350° C. or more and 500° C. or less.

19. The method for producing the methane combustion catalyst according to claim 7, wherein the method sets a heating temperature in the second burning step to 350° C. or more and 500° C. or less.

20. A method for purifying combustion exhaust gas comprising oxidatively removing methane from a combustion exhaust gas containing sulfur oxide,
wherein the method brings the combustion exhaust gas into contact with the methane combustion catalyst defined in claim 2 at a reaction temperature of 340° C. or more and 500° C. or less.

* * * * *